(12) United States Patent
Lo

(10) Patent No.: US 8,281,831 B2
(45) Date of Patent: Oct. 9, 2012

(54) ASYMMETRIC PATTERN TREAD FOR ATV TIRE

(76) Inventor: Tsai Jen Lo, Chang-Hwa (TW)

( * ) Notice: Subject to any disclaimer, the term of this patent is extended or adjusted under 35 U.S.C. 154(b) by 949 days.

(21) Appl. No.: 12/318,637

(22) Filed: Jan. 5, 2009

(65) Prior Publication Data

US 2010/0170599 A1 Jul. 8, 2010

(51) Int. Cl.
*B60C 11/04* (2006.01)
(52) U.S. Cl. .................. 152/209.8; 152/209.13; 152/901
(58) Field of Classification Search ............... 152/209.8, 152/209.11, 209.12, 209.13, 901; D12/544, D12/505, 512, 579
See application file for complete search history.

(56) References Cited

U.S. PATENT DOCUMENTS

D372,004 S * 7/1996 Rooney .................. D12/571
6,530,404 B1 * 3/2003 Rooney .................. 152/209.11

* cited by examiner

*Primary Examiner* — Eric Hug
(74) *Attorney, Agent, or Firm* — Rosenberg, Klein & Lee

(57) ABSTRACT

A tire for All Terrain Vehicles includes the first ribs located within a central area of the tread, which are non-continuously arranged, and the second ribs which are next to the ATV. The first ribs are separated by first gaps and the second ribs are separated by second gaps, the first and second gaps are located alternatively to each other.

10 Claims, 4 Drawing Sheets

ASYMMETRIC PATTERN TREAD FOR ATV TIRE

FIELD OF THE INVENTION

The present invention relates to a tire tread for vehicles, more particularly, for ATV, which includes two asymmetric oblong patterns.

BACKGROUND OF THE INVENTION

All Terrain Vehicle (ATV) is suitable for running on off-roads such as sandy roads or muddy roads. The ATV has four wheels, i.e., a pair of front wheels and a pair of rear wheels.

The tires for the ATV requires a wider tread so as to keep a larger contact area with the road and generate larger traction such that the ATV hardly slides while riding on sandy roads. The ATV with suitable pattern tires is easy to operate and to turn.

It is noted that the rider on the ATV has to lean his or her body to shift the center of gravity while turning. If the tires have less capacity for expelling sands away, the vehicle will be hard to control and therefore require a lot of power to balance while operating the ATV on the sandy roads.

The conventional tires for ATVs generally include bold tires, single-rib tread tires and double-rib tread tires, the bold tires have less traction on sandy roads and the ATV oversteers easily. The single-rib tread tires have better expelling sand feature when compared with the bold tires. Both of them cannot meet requirements for the riders when riding the ATV on beaches or sand hills. The double-rib tread tires expel sands easily but the ATV understeers and the riders have to lean his or her body to correct the direction of the ATV, as a result this costs a lot of energy.

SUMMARY OF THE INVENTION

The present invention provides an ATV tire of two asymmetric oblong pattern in which a plurality of non-continuous ribs are disposed on a tread surface. The ribs are alternatively arranged along the tread of the tire and the gaps between the ribs and the height of the ribs are specified so as to obtain desired performances for the ATV.

The tire tread comprises out side portion far away from the vehicle and inner side portion near to the vehicle. The first ribs located within the central area of the tread are non-continuously arranged and the second ribs located at inner side portion of the tread are also non-continuously arranged. Distance "a" between the first ribs and the second ribs is defined.

The primary object of the present invention is to provide tire tread with first and second ribs, the first and second ribs are separated by first and second gaps respectively, and the first and second gaps are located alternatively to each other. Such tire expels sands efficiently and provides precise control to the All Terrain Vehicle.

Another object of the present invention is to provide tire tread with first and second ribs, and the tire is cooperated with proper camber angles of the front wheels of the ATV so as to have satisfied control feature.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
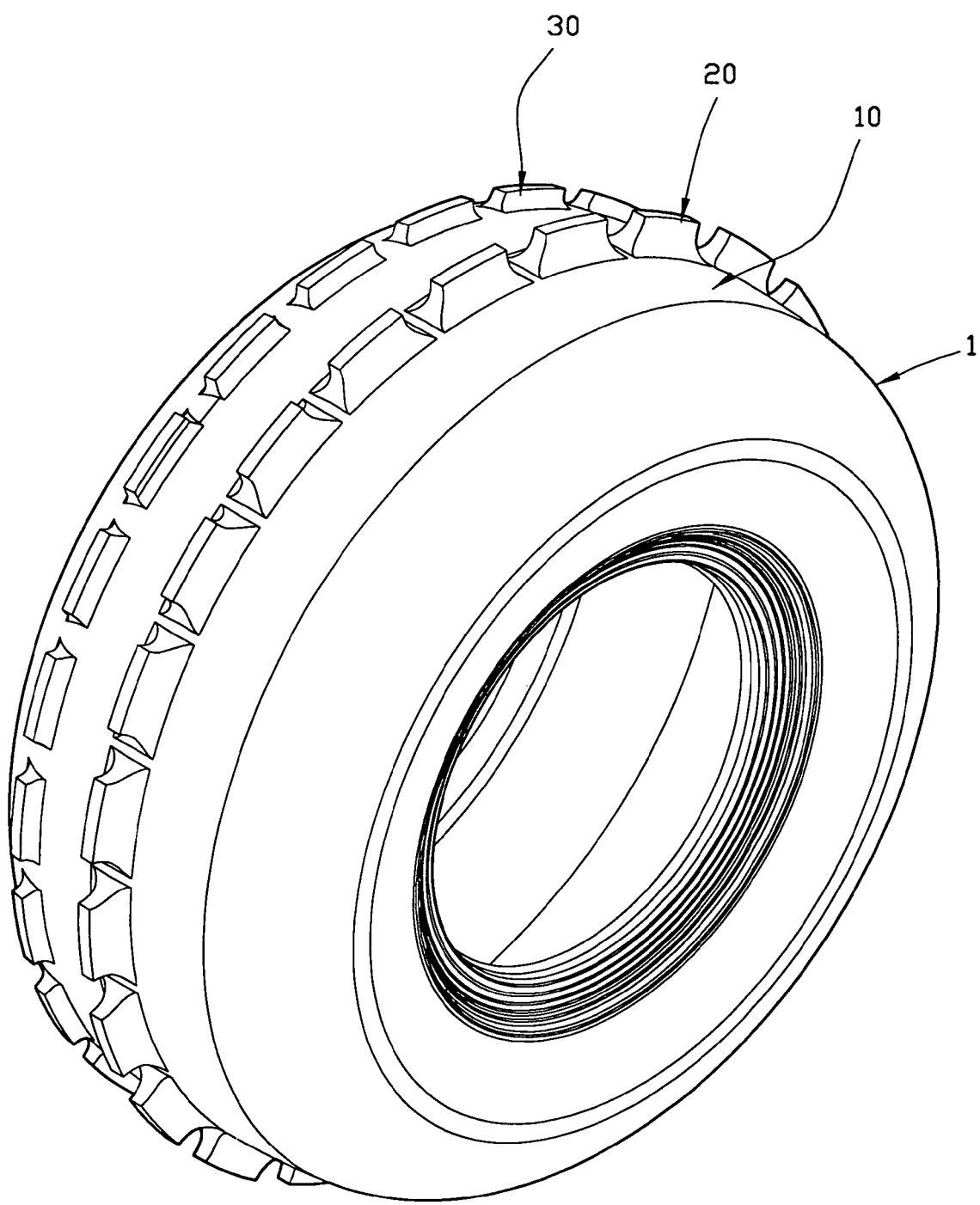
FIG. 1 is a perspective view to show the tire of the present invention.
Figure 2:
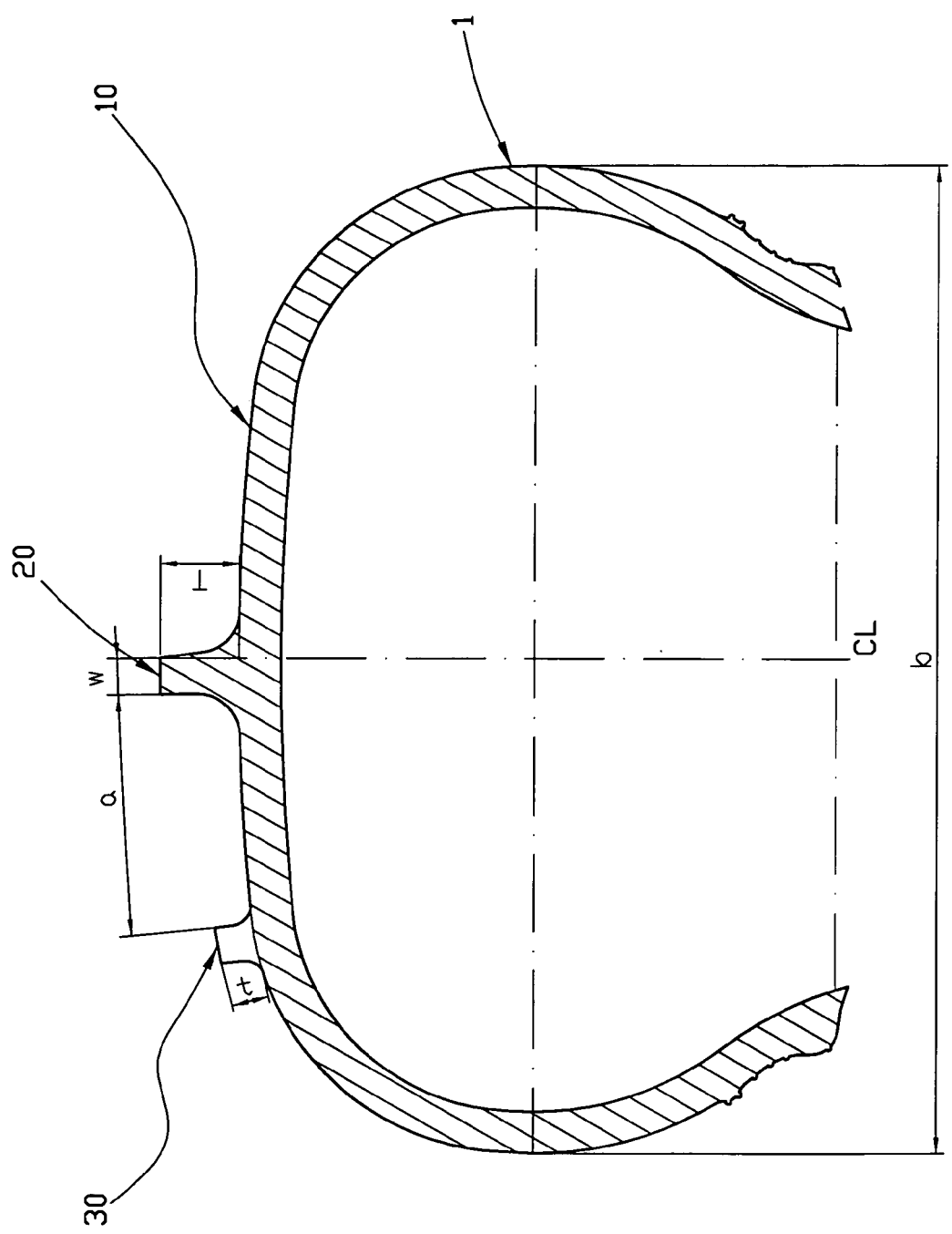
FIG. 2 is a cross sectional view of the tire of the present invention.
Figure 3:
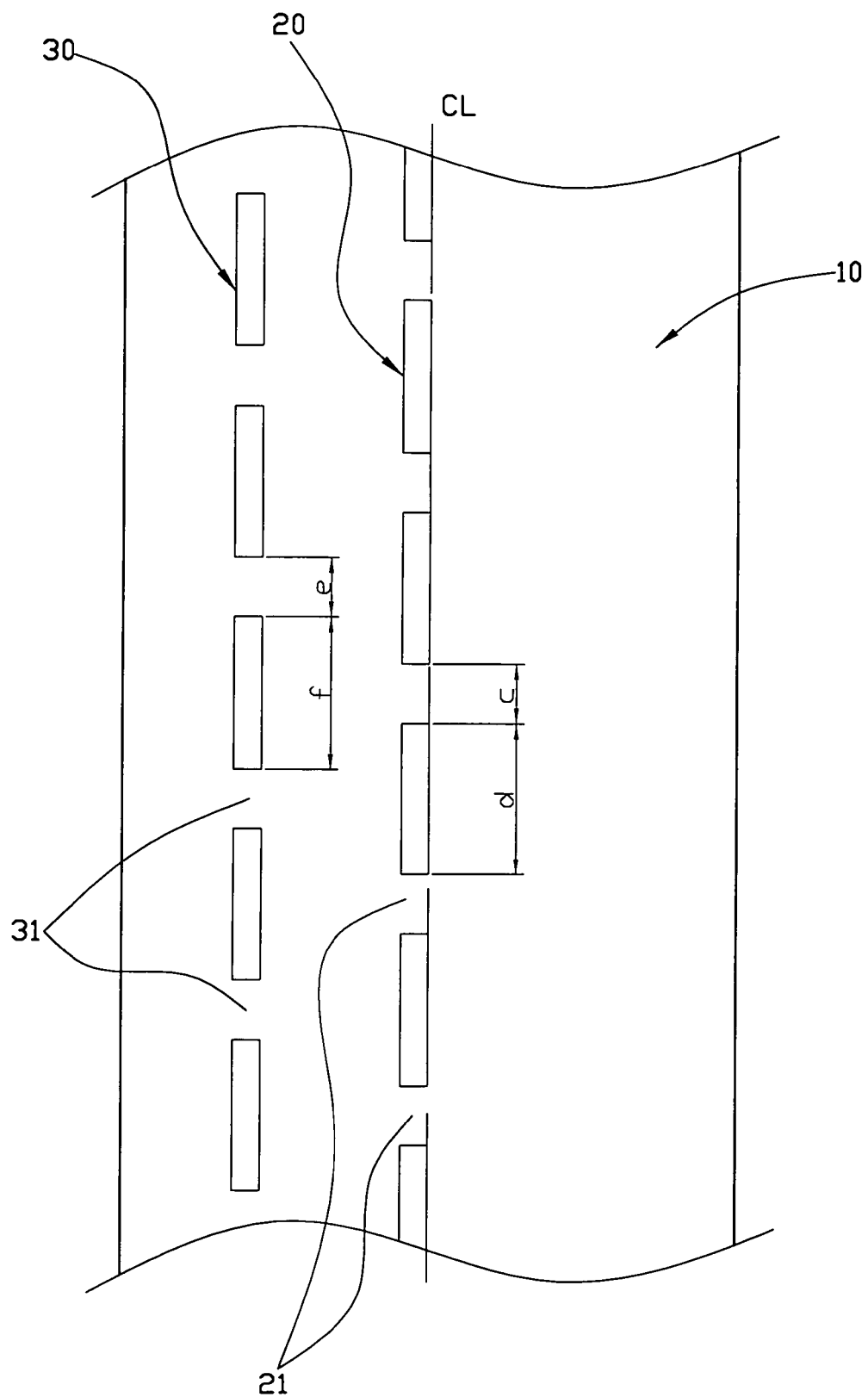
FIG. 3 shows the arrangement of the first and second ribs of the present invention.

Referring to FIGS. 1 to 3, the tire 1 of the present invention comprises a tread 10 with out side portion 11 and inner side portion 12, wherein the first ribs 20 located within a central area of the tread 10 are non-continuously arranged. The first ribs 20 are separated by first gaps 21 and the central area is defined by 10 mm from two sides of a central line of the tread 10.

The second ribs 30 are located at inner side portion 12 of the tread 10 and distance "a" between the first ribs 20 and the second ribs 30 is defined. The second ribs 30 are separated by second gaps 31, the first and second gaps 21, 31 are disposed alternatively to each other. Namely the first ribs 20 and the second ribs 30 are located asymmetrically on the tread 10.

The distance "a" between the first ribs 20 and the second ribs 30 is 20% to 30% of a width "b" of the tread 10. A length "c" of each of the first gaps 21 between the first ribs 20 is longer than 2 mm and the length "c" of each of the first gaps 21 is 20% to 60% of a length "d" of each of the first ribs 20.

When the value of the distance "a" is less than 20% of the width "b" of the tire tread 10, the control of the vehicles will be understeer, and when the value of the distance "a" is larger than 40% of the width "b" of the tire tread 10, the control of the vehicles will be oversteer.

A length "e" of each of the second gaps 31 between the second ribs 30 is longer than 2 mm and a length "e" of each of the second gaps 31 is 20% to 60% of the length "f" of each of the second ribs 30. Besides, a radial height "t" of each of the second ribs 30 is 30% to 100% of a radial height "T" of each of the first ribs 20. If the value of "t" is less than 30% of the value "T", the performance of the tire 1 with first and second ribs 20, 30 will be similar to that of the tire 1 with only one ribs of the conventional tire. If the two respective values of "c" and "e" are less than 2 mm, the tire 1 will be difficult to expel sands. When the value "c" is 20% to 60% of the value "d", and the value "e" is 20% to 60% of "f", the tires 1 have proper brake performance and the ATV hardly slide.

A width "w" of each of the first and second ribs 20, 30 is 3 mm to 10 mm so as to maintain the vehicle to run linearly.

Figure 4:
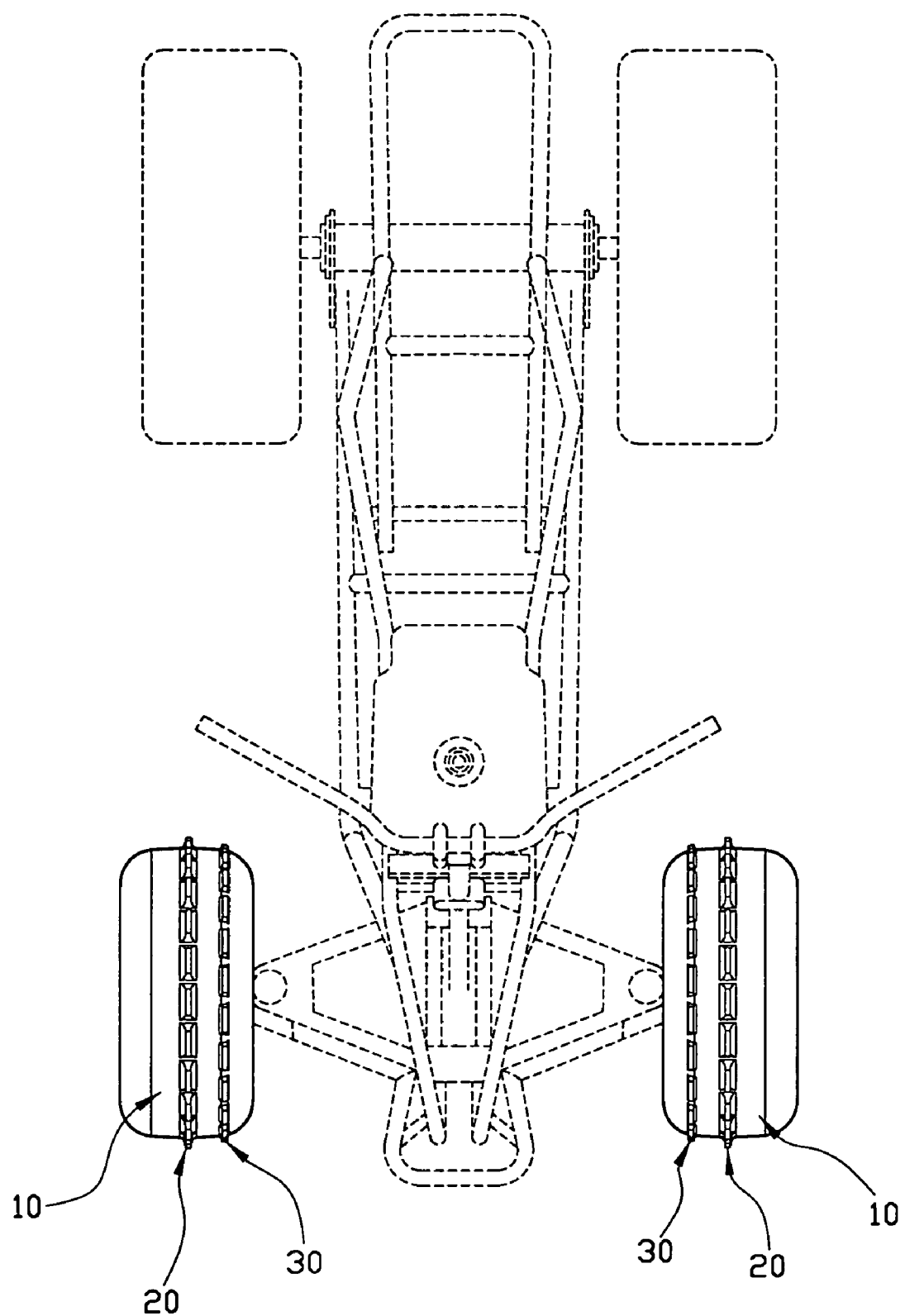
FIG. 4 shows the two front wheels of an All Terrain Vehicle.

As shown in FIG. 4, the tires 1 are used as two front wheels of an All Terrain Vehicle and the second ribs 30 of each tire 1 are next to the All Terrain Vehicle. By this tires 1 and arrangement, the sands are efficiently expelled by the first and second ribs 20, 30 and the vehicle can be easily controlled namely, the vehicle can keep the straight and without slip, and have good steerage.

While we have shown and described the embodiment in accordance with the present invention, it should be clear to those skilled shown in the art that further embodiments may be made without departing from the scope of the present invention.

What is claimed is:
1. A tire comprising:
a tread with an outside portion and an inner side portion connected thereto;
a plurality of first ribs located within a central area of the tread and the first ribs are non-continuously arranged, and a plurality of second ribs located at the inner side portion of the tread and a distance "a" being defined between the first ribs and the second ribs, the first ribs and the second ribs being located asymmetrically on the tread.

2. The tire as claimed in claim 1, wherein the first ribs are separated by first gaps and the second ribs are separated by second gaps, the first and second gaps are located alternatively with respect to each other.

3. The tire as claimed in claim 1, wherein the distance "a" between the first ribs and the second ribs is 20% to 30% of a width of the tread.

4. The tire as claimed in claim 2, wherein a length of each of the first gaps between the first ribs is longer than 2 mm and the length of each of the first gaps is 20% to 60% of a length of each of the first ribs.

5. The tire as claimed in claim 1, wherein the central area is 10 mm from two sides of a central line of the tread.

6. The tire as claimed in claim 2, wherein a length of each of the second gaps between the second ribs is longer than 2 mm and a length of each of the second gaps is 20% to 60% of the length of each of the second ribs.

7. The tire as claimed in claim 1, wherein a radial height of each of the second ribs is 30% to 100% of a radial height of each of the first ribs.

8. The tire as claimed in claim 1, wherein a width of each of the first and second ribs is 3 mm to 10 mm.

9. A tire comprising:
a tread with an outside portion and an inner side portion connected thereto;
a plurality of first ribs located within a central area of the tread and the first ribs are non-continuously arranged to have first gaps therebetween, and
a plurality of second ribs located at the inner side portion of the tread and a distance "a" being defined between the first ribs and the second ribs, the second ribs being separated by corresponding second gaps and a length of each of the second gaps between the second ribs is longer than 2 mm and a length of each of the second gaps is 20% to 60% of the length of each of the second ribs.

10. A tire comprising:
a tread with an outside portion and an inner side portion connected thereto;
a plurality of first ribs located within a central area of the tread and the first ribs are non-continuously arranged, and
a plurality of second ribs located at the inner side portion of the tread and a distance "a" being defined between the first ribs and the second ribs, a width of each of the first and second ribs being 3 mm to 10 mm.

* * * * *